US012610959B2

(12) United States Patent
Grill et al.

(10) Patent No.: US 12,610,959 B2
(45) Date of Patent: Apr. 28, 2026

(54) SYSTEM FOR FORMING MOULDED MEAT PRODUCTS

(71) Applicants: MAREL FURTHER PROCESSING B.V., Boxmeer (NL); MAREL FRANCE, Baud (FR)

(72) Inventors: Jean Noël Grill, Baud (FR); Jacques Le Paih, Baud (FR); Fabrice Le Pabic, Baud (FR); Thomas Willem Dekker, Boxmeer (NL); Johannes Martinus Meulendijks, Boxmeer (NL)

(73) Assignees: MAREL FURTHER PROCESSING B.V., Boxmeer (NL); MAREL FRANCE, Baud (FR)

( * ) Notice: Subject to any disclaimer, the term of this patent is extended or adjusted under 35 U.S.C. 154(b) by 347 days.

(21) Appl. No.: 18/550,555

(22) PCT Filed: Mar. 30, 2022

(86) PCT No.: PCT/EP2022/058443
§ 371 (c)(1),
(2) Date: Sep. 14, 2023

(87) PCT Pub. No.: WO2022/207722
PCT Pub. Date: Oct. 6, 2022

(65) Prior Publication Data
US 2024/0292849 A1 Sep. 5, 2024

(30) Foreign Application Priority Data
Mar. 31, 2021 (EP) ..................................... 21305416

(51) Int. Cl.
*A22C 7/00* (2006.01)

(52) U.S. Cl.
CPC .......... *A22C 7/0069* (2013.01); *A22C 7/0076* (2013.01)

(58) Field of Classification Search
CPC ..... A22C 11/00; A22C 7/0069; A22C 7/0076; A23P 30/10
See application file for complete search history.

(56) References Cited

U.S. PATENT DOCUMENTS

| | | | |
|---|---|---|---|
| 4,358,468 A | 11/1982 | Dolan et al. | |
| 4,479,614 A | 10/1984 | Bernard | |

(Continued)

FOREIGN PATENT DOCUMENTS

| | | |
|---|---|---|
| EP | 0094877 B1 | 6/1987 |
| WO | 2017072471 A1 | 5/2017 |

OTHER PUBLICATIONS

Extended European Search Report from corresponding European Patent Application No. 21305416.6, Sep. 24, 2021.

(Continued)

*Primary Examiner* — Nahida Sultana
(74) *Attorney, Agent, or Firm* — Workman Nydegger

(57) ABSTRACT

A system for forming moulded meat products from a meat mass comprising. The system comprises a mould with at least one mould cavity, a meat supply pump and an interface module for connecting the meat supply channel to the mould. The interface module comprises a tubular section, a meat supply opening, a meat delivery opening, and a rotatable drive shaft comprising a first end outside the tubular section, configured to engage with a drive means and a second end extending inside the tubular section. The system further comprises an additive supply for controllably supplying an additive via an additive supply channel.

24 Claims, 4 Drawing Sheets

(56)          References Cited

U.S. PATENT DOCUMENTS

| | | | |
|---|---|---|---|
| 4,610,844 | A | 9/1986 | Matthews et al. |
| 4,898,697 | A * | 2/1990 | Horton .................... B29C 33/36 |
| | | | 264/297.6 |
| 5,846,588 | A | 12/1998 | Zimmermann et al. |
| 9,095,148 | B2 | 8/2015 | Braig et al. |
| 9,545,113 | B2 | 1/2017 | Spierts et al. |
| 11,006,641 | B2 | 5/2021 | Le Paih et al. |
| 2002/0012731 | A1 * | 1/2002 | van Esbroeck .... A22C 17/0006 |
| | | | 426/496 |
| 2003/0227108 | A1 * | 12/2003 | Okerson ............. B29C 45/1642 |
| | | | 264/297.6 |
| 2007/0224306 | A1 * | 9/2007 | van Esbroeck ....... B30B 15/308 |
| | | | 425/89 |
| 2014/0212558 | A1 * | 7/2014 | Spierts ................... A22C 11/08 |
| | | | 426/519 |
| 2019/0116814 | A1 | 4/2019 | Le Paih et al. |
| 2020/0245632 | A1 * | 8/2020 | Lok .................... A22C 17/0026 |
| 2023/0115775 | A1 * | 4/2023 | Le Paih ............... A22C 7/0069 |
| | | | 452/174 |

OTHER PUBLICATIONS

International Search Report from corresponding PCT Application No. PCT/EP2022/058443, Oct. 10, 2022.

* cited by examiner

SYSTEM FOR FORMING MOULDED MEAT PRODUCTS

FIELD OF THE INVENTION

The present invention relates to system for forming moulded meat products, such as hamburger patties from a meat mass.

BACKGROUND OF THE INVENTION

Systems for forming moulded meat products from a ground meat mass commonly comprise a storage, e.g. a hopper, for the meat mass which meat mass is pumped into a mould cavity for forming a moulded meat product. After filling such mould cavity with a portion of the meat mass the mould is commonly moved to an ejection location, at which location the meat product, e.g. a hamburger patty, is ejected from the mould and transported to be processed and/or packaged further on in the production line. The meat mass is commonly minced meat, and can be mixed with a seasoning and/or a marination before it is put in the storage location, e.g. hopper, from which it is pumped towards the mould. Such a mould is typically implemented as a drum, a plate or carrousel, the mould comprising multiple mould cavities.

A known system is, for example, disclosed in WO 2017/072471 A1. These known systems are particularly well suited for large production runs of uniform meat products, e.g. burgers, such as mid to high volume industrial production lines where no variation is required on shape, taste and contents of the burger patties, but are generally less equipped to cope with variations or shorter production runs as the meat is uniformly seasoned before it enters the storage, e.g. hopper, to be pumped towards the mould. In cases where shorter runs are required, for example in order to produce a variation of seasoned or marinated burgers, or in case a variety of inclusions is desired in moulded meat products such as e.g. hamburgers, the forming system needs to be emptied, cleaned and refilled with another variety of seasoned and/or marinated meat mass. This may result in cleaning losses of the meat mass that is already present in the piping from the storage to the mould and in downtime of the forming system. Depending on the specific configuration of the forming system it may not be uncommon that about 10-50 kilograms of meat is present in the system between the storage and the mould.

SUMMARY OF THE INVENTION

In a first aspect of the invention, a system for forming moulded meat products from a meat mass is provided, comprising:
- a mould comprising at least one mould cavity for forming a minced meats food product;
- a meat supply pump for controllably supplying the meat mass via a meat supply channel;
- an interface module for connecting the meat supply channel to the mould, wherein the interface module comprises:
- a tubular section;
- a meat supply opening configured to engage with the meat supply channel;
- a meat delivery opening configured to deliver the meat mass from the interface module into the at least one mould cavity;

- a rotatable drive shaft comprising a first end outside the tubular section, configured to engage with a drive means, and a second end extending inside the tubular section;
- wherein the system further comprises an additive supply pump for controllably supplying an additive via an additive supply channel, and wherein the interface module further comprises an additive supply opening configured to engage with the additive supply channel, such that the additive supply channel is fluidly connectable to an additive distribution means for distributing the additive into the meat mass inside of the tubular section.

In such system according to the present invention, the interface module(s) each comprise an additive distribution means for distributing an additive into the meat mass in the tubular section that connects to the mould. As a result, the meat mass that is provided with and/or mixed with a specific additive is relatively small, in particular compared with the meat mass that is available in the storage, e.g. hopper, of the system. Therefore, the changeover to another variant of the burger is much easier and quicker than in the known systems, meat losses are smaller, and the time needed for switching to another variant of the burger is less than in known systems. This typically results in a more flexible and economical system in cases where smaller batch sizes are desired, for example in case of a single basic meat mass that is to be processed into a plurality of burger variants in terms of additives to the basic meat mass.

In the context of this application, the term "meat" is intended to describe any types of meat of animal origin, such as poultry, beef, pig and other animal-based proteins, but also includes meat replacements such as plant-based or synthetic proteins suitable for human consumption that are suitable to be processed into moulded meat products. The term "meat mass" is intended to describe any deformable meat mass that is minced, ground and/or chopped. The latter may include cubes or strips of meat, typically ranging from 5×5×5 mm to 20×20×40 mm.

Exemplary additives according to the invention are e.g. marination fluids and inclusions. Marination fluids are generally relatively low viscous fluids in which aromas, salts and/or other flavouring and/or colouring components are dissolved and/or dispersed. Marination fluids are typically mixed in a homogenous fashion throughout a meat mass. Inclusions are generally solid or relatively high viscous units that can be distributed throughout the meat mass, wherein the inclusions in general remain identifiable within the meat mass as individual units or portions. Inclusions may be added to a meat mass to modify the structure of the end product and/or as an individual ingredient. Exemplary inclusions according to the invention are, for example, chopped vegetables or chopped fruit e.g. coarsely chopped, for example onions, tomatoes, olives, paprika and other fruits, herbs, vegetables and/or other flavourings, but may also include cubed or cut pieces of meat, e.g. other types of meat than the main meat mass and/or individualized stream of paste like viscous cheese, or flavoured paste to mimic a flavouring like paprika, tomato or the like.

The system according to the invention comprises an interface module for connecting the meat supply channel to the mould. The interface module according to the invention comprises a meat delivery opening configured to deliver the meat mass from the interface module into the at least one mould cavity. This meat delivery opening may comprise a single opening or may be configured to receive an element provided with one or more holes from which the meat flows into the mould cavity.

The interface module comprises a tubular section. The tubular section according to the invention may have a substantially cylindrical shape with a substantially constant or varying cross-section over its length, but may alternatively also have other suitable shapes in order to connect the meat supply opening with the meat delivery opening, such as e.g. a substantially frustoconical shape or combinations thereof. The tubular section may include one or more curved sections in order to align with the further configuration of the system.

In an embodiment, the tubular section comprises an inlet portion that extends from the meat supply opening to an adjoining outlet portion of the tubular section, wherein the outlet portion of the tubular section extends to the meat delivery opening.

In an embodiment, the inlet portion of the tubular section is delimited by an elbow housing part with the meat supply opening at one side thereof and with a connection to the outlet portion of the tubular section at another side thereof. In embodiments, the meat supply opening is perpendicular to the outlet portion tubular section, e.g. the elbow housing forming a curved section between the meat supply opening and the connection to the outlet portion of tubular section of the housing of the interface module.

The interface module according to the invention comprises a rotatable drive shaft. The drive shaft comprises a first end outside of the tubular section, which end is configured to engage with a drive means and a second end extending inside the tubular section. For example, the drive shaft extends through the elbow housing portion, e.g. the elbow housing portion having a bearing for the drive shaft. The second end of the drive shaft extends inside the tubular section, e.g. aligned with a center axis of the outlet portion of the tubular section. Preferably, the drive shaft enters the tubular section at a location of the tubular section at which the meat mass is not yet provided with the additive. The drive shaft extends towards the meat delivery opening of the tubular section. The length of the drive shaft inside of the tubular section may vary e.g. depending on the specific configuration in order to produce the desired type of burger and the type of additive.

In embodiments, the interface module comprises a mixer and/or grinder that is driven by the drive shaft.

The system according to the invention further comprises an additive supply for controllably supplying an additive via an additive supply channel to an additive supply opening of the interface module. Such additive supply may be configured to supply a continuous flow of the additive or may be controlled to intermittently supply the additive e.g. based on a timer and/or a sensor signal in an in itself known fashion. The additive supply opening provides a connection between the additive supply channel and an additive distribution means for distributing the additive into the meat mass inside of the tubular section of the interface module. The connection may be implemented e.g. by means of a screw, bayonet or any other suitable connection. The additive is fed from the additive supply opening through the additive distribution means to be distributed into the meat mass.

In embodiments, the additive distribution means are located in and/or integrated in the inlet portion of the tubular section, e.g. in the elbow housing part. For example, the additive distribution means define one or more distribution points within the elbow housing part, wherein the additive is supplied to the meat mass. In an embodiment, the one or more distribution points are located at a distance upstream of the join between the elbow housing part and the outlet portion of the tubular section. For example, a grinder and/or mixer is located in proximity of the join between the elbow housing part and the outlet portion of the tubular section. In an embodiment, the one or more distribution points are located in proximity of the join between the elbow housing part and the outlet portion of the tubular section. In another embodiment, the one or more distribution points are located in the outlet portion of the tubular section, e.g. in proximity of the meat delivery opening.

The additive supply according to the invention may comprise an additive supply pump to urge the additive into the meat mass. Suitable pumps are known in the art and may be dependent on the specific characteristics such as viscosity of the additive.

The meat mass enters the interface module at the meat supply opening and is urged through the tubular section. At the additive distribution means the additive is distributed through the meat mass, either homogenously mixed through the meat mass or distributed as individual particles or units. Downstream the additive distribution means, the meat mass contains the supplied additive and the combined meat mass with additive is fed into the mould at the meat delivery opening. It is noted that the basic meat mass may already be (partly) seasoned and/or marinated when supplied into the storage where it is pumped towards the interface module.

The amount of meat mass that is provided with the additive from the additive distribution means of the interface module is preferably less than 5 kilograms, preferably less than 2.5 kilograms, more preferably less than 1000 grams, depending on the specific configuration of the system.

In an embodiment according to the invention, the drive shaft extends into the section of the interface module where the additive distribution means in operation distribute the additive into the meat mass.

The tubular section of the interface module may be divided into three imaginary sections; the first section where the meat mass enters the interface module; the second section at which the additive is being distributed into the meat mass; the third section in which the meat mass is combined with the additive and urged towards the meat delivery opening. In this embodiment, for example, the drive shaft enters the tubular section in the boundary area between the first and the second imaginary section.

In an embodiment according to the invention, the system further comprises a grinding plate mounted to the interface module by holding means for holding the grinding plate in a cross section of the tubular section. Such grinding plate in the tubular section, e.g. in combination with a grinder driven by the shaft, grinds the meat mass into the required structure to be formed as a minced meats food product such as a hamburger patty and at the same time the grinding plate may have a positive effect on the homogenous distribution of the additives in the meat mass. The grinding plate may be mounted to the interface module at several positions, wherein the location of the grinding plate may influence the structure and the protein orientation of the formed end product.

In an embodiment according to the invention, the mould comprises one of a rotatable drum, a rotatable plate, and a reciprocal plate. In order to have an efficient meat product, e.g. burger, forming system it may be found advantageous to fill a mould cavity with meat mass and rotate or translate the mould cavity to an ejection location at which it is ejected from the mould while another mould cavity may be filled to form a subsequent burger. Such system configuration may be achieved by a rotatable drum comprising a plurality of mould cavities at its circumference, by a rotatable plate or carrousel configuration in which a plurality of mould cavities are available whereas the axis of rotation is aligned perpendicular to the plane of the rotatable plate, or by a reciprocal plate wherein the plate comprising at least one mould cavity translates from a fill position to an ejection position in a reciprocating fashion.

In an embodiment according to the invention, the system further comprises a meat supply pump controller configured to, in operation, activate the meat supply pump to intermittently supply an amount of meat mass. By supplying an intermitting supply of the meat mass, the meat mass at the meat delivery opening of the interface module will provide an intermittent supply of meat mass into the mould cavity which gives the mould time to move a filled mould cavity to its ejection location and place another mould cavity into the fill position of the system.

In further embodiment according to the invention, the meat supply pump controller is configured to activate the meat supply pump in response to the detection of an available mould to be filled, wherein the amount of supplied meat mass is related to the volume of the mould to be filled. By supplying an intermitting supply of the meat mass, the meat mass at the meat delivery opening of the interface module will provide an intermittent supply of meat mass into the mould cavity which gives the mould time to move a filled mould cavity to its ejection location and place another mould cavity into the fill position of the system. Depending on the consistency of the supplied meat mass and the required consistency of the end-product, the amount of meat supplied in each fill operation may be different than the exact volume of the mould cavity to take account for air between the meat, compression of the meat mass and also to take the added volume of the additives into account.

In an embodiment according to the invention, an additive distribution tool is mounted to the second end of the rotatable drive shaft. Such additive distribution tool may be implemented as a mixer element to mix the additive, e.g. the marinade, through the meat mass at the location of the additive distribution to at least partially homogenize the additive with the meat mass. Alternatively, the additive distribution tool may be implemented to individualize a stream of viscous inclusions such as e.g. a stream of cheese paste that is cut into discrete portions from a constant flow at the terminal openings of the additive distribution means.

In an embodiment according to the invention, the drive shaft is rotatable around an axis of rotation that is directed substantially perpendicular to the ground plane or bottom of the mould cavity. Such configuration enables the drive shaft to be utilized to drive a grinder and/or stripper plate in order to improve protein orientation in the end product. It will be appreciated that the drive shaft can be utilized to drive a single or a plurality of elements in the tubular section of the interface such as a grinder and an additive distribution tool.

In a further embodiment according to the invention, the flow direction at the meat supply opening of the interface module is directed substantially perpendicular to the axis of rotation of the drive shaft. In many system configurations it is considered advantageous to have a perpendicular supply of meat mass to the interface module, such that the meat mass is fed towards the mould cavity following a substantially 90-degree angle within the interface module. In many configurations this enables a reduction of the total footprint of the system.

In an embodiment according to the invention, the additive distribution means comprise a tube extending from the additive supply opening and bifurcating into a plurality of end points, wherein the end points are distributed over the cross-section of the tubular section. By supplying the additive at multiple locations across the cross-section of the interface module an initial spread over the cross-section is accomplished. Additional tools may be used to further homogenize the meat mass with the additives if desired. In case of inclusions, it is typically considered advantageous that the inclusion particles are distributed over the whole cross section of the end product.

In an embodiment according to the invention, the end points terminate substantially at the second end of the drive shaft as seen in flow direction of the meat mass. By placing the end points of the additive distribution means, i.e. the locations of the openings at which the additive distribution means provide the additive into the meat mass, near the second end of the drive shaft, the drive shaft can be utilized to process the additive as desired, whether it is desired to homogenize the additives into the meat mass or whether the drive shaft is used to cut up the—more viscous—additive such as inclusions.

In an embodiment according to the invention, the interface module further comprises a homogenizing means statically mounted in the tubular section of the interface module downstream the second end of the drive shaft as seen in flow direction of the meat mass.

In an embodiment, the invention envisages the consecutive forming—using the system as discussed herein—of batches of a first variant of the meat products and of a second variant of the meat products are formed from a basic meat mass that is stored in a storage, e.g. a hopper, of the system, the variants differing in terms of one or more additives that are added to the basic meat mass via the additive distribution means. In a preferred embodiment, the method comprises a changeover from the forming of the first variant to the forming of the second variant, wherein the changeover involves keeping the basic meat mass in the storage, e.g. hopper, meat supply pump, and meat supply channel, whilst cleaning the one or more interface modules of the system. This approach, for example, avoids undue loss of meat in the changeover compared to known system, is less-time consuming, etc.

In an embodiment, the cleaning of the one or more interface modules during the changeover comprises disconnecting the one or more interface modules, cleaning the disconnected interface modules, and reconnecting the cleaned interface modules. In another embodiment, the cleaning comprises disconnecting the one or more interface modules and exchanging the one or more disconnected interface modules for one or more other interface modules that are already clean.

In embodiments, the additive(s) supplied via the additive distribution means comprises a marination fluid and/or one or more inclusions, wherein said one or more inclusions, for example, comprise or consist of chopped vegetables or chopped fruit, e.g. coarsely chopped, for example onions, tomatoes, olives, and/or paprika.

Reference is made to details and advantages in the description of corresponding elements and functionality of the food processing line in the description here above. Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein:

FIG. 4A-F are partial cross-sections and schematic views of variants of embodiments of the interface module according to the invention.

DETAILED DESCRIPTION OF EMBODIMENTS

Figure 1:
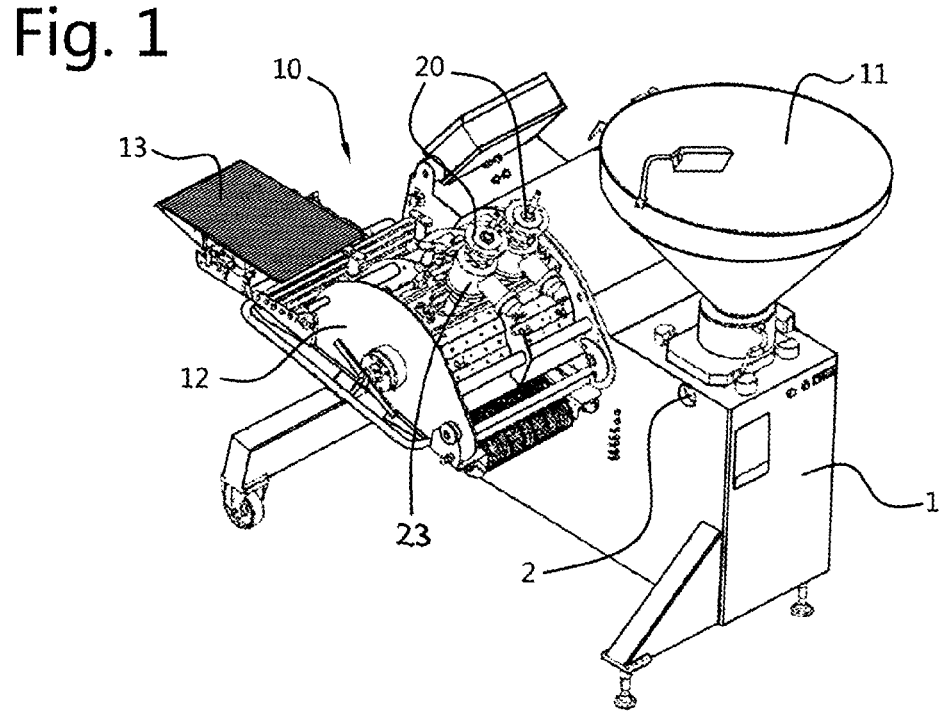
FIG. 1 schematically illustrates a perspective drawing of a general three-dimensional view of a system for forming moulded meat products according to the invention.

The present invention will now be described with reference to the accompanying drawings, wherein the same reference numerals have been used to identify the same or similar elements throughout the several views.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

FIG. 1 schematically illustrates a perspective drawing of a general three-dimensional view of a system 10 for forming moulded meat products, in casu hamburger patties denoted with S, according to the invention.

The system 10 for forming ground meat food products such as hamburgers S according to the invention includes a base 1 including, in a manner known per se, means for controlling and implementing the system for forming ground meat pieces S according to the invention.

Inter alia, the base 1 includes a supply pump of which an inlet is connected to an outlet of a hopper 11 wherein is stored the meat intended for producing ground meat pieces S. The meat contained in the hopper 11 can be minced or not.

An outlet 2 of the supply pump is connected to one or more supply channels 3 (that can be seen in FIG. 2, for example) for the mass of meat. For example, the supply channel 3 has branches corresponding to the number of interface modules 20 of the system 10.

The meat supply channel 3 is connected to one or more interface modules 20 which will be discussed in more detail following this description.

The mould 14 is a mould of the rotating drum type, which type is known per se.

The drum 14 has a peripheral or outer surface with multiple series of cavities 140. These series of cavities extend substantially parallel to and at a distance from one another, viewed in the direction of the rotation axis 141 of the drum 14. Each series comprises multiple cavities 140 which are at a distance from one another, viewed in peripheral direction of the peripheral surface of the moulding drum. The cavities each define a filling opening in the peripheral surface of the moulding drum, wherein the cavities are each closed at a side opposite the filling opening by a bottom.

The system 10 comprises a structural part 12 that is mounted to the base 1, and that supports a shoe member 15 that adjoins an arc segment of the peripheral surface of the moulding drum 14.

The structural part 12 supports, for each series of cavities 140, a corresponding interface module 20, preferably in a releasable manner, e.g. in view of cleaning and/or exchanging the interface modules 20.

The system 10 for forming ground meat pieces S according to the invention includes a conveyor 13 for discharging ground meat pieces developed in the mould 14 to a packaging station, for example.

Figure 2:
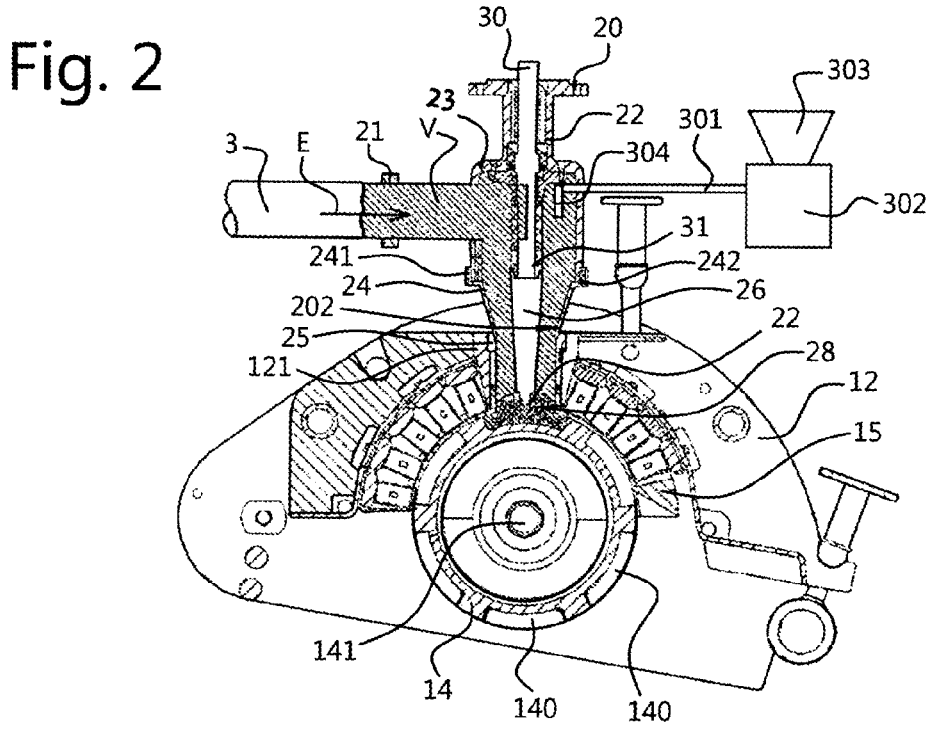
FIG. 2 is a partial cross-section view of the system for forming hamburger patties in FIG. 1 illustrating an element for forming an interface between the supply channel and the mould.

FIG. 2 is a partial cross-section view of the system for forming hamburger patties in FIG. 1 illustrating an element for forming an interface between the supply channel 3 and the mould 14, called interface module 20.

The interface module 20 includes an inlet portion 23 of a tubular section thereof, which inlet portion 23 extends from a meat supply opening 21 of the module 20 to an adjoining outlet portion 24, 25 of the tubular section of the module 20. The outlet portion 24, 25 of the tubular section extends to a meat delivery opening of the module 20.

It is illustrated that the inlet portion 23 of the tubular section is delimited by an elbow housing part with the meat supply opening 21 at one side thereof and with a connection to the outlet portion 24, 25 of the tubular section at another side thereof. The meat supply opening 21 is at an angle, e.g. perpendicular, to the outlet portion of the tubular section 24, 25.

The supply channel 3, e.g. formed by a rigid or flexible tube, is connected at one end to the meat pump housing and at another end to the meat supply opening 21 of the module 20, preferably releasably.

The outlet portion of the tubular section 24, 25 includes a first end 241 that is joined, preferably releasably, to inlet portion 23, e.g. the elbow housing part, which in turn is connected to the outlet of the meat supply channel 3. The outlet portion of the tubular section 24, 25 includes a second end 201 opposite to the first end 241, which forms or is in proximity of the meat delivery opening, to fill the cavities 140 in the mould 14.

The interface module(s) of the system 10 for forming ground meat pieces S according to the invention further includes a rotatable drive shaft 30, 31.

The drive shaft 30, 31 extends into the interface module 20, here coaxially at the axis of the outlet portion of the tubular section 24, 25. The drive shaft 30, 31 comprises a first end 30 outside of the interface module 20 and a second end 31 extending inside the interface module 20. As shown, the drive shaft 30, 31 extends through the elbow housing part 23, which part 23 is provided with a bearing for the shafts and one or more seals.

The elbow housing part 23 has the meat supply opening 21 at one side thereof and a connection to the outlet portion of the tubular section 24, 25 at another side thereof. In the depicted embodiment, the meat supply opening 21 is perpendicular to the outlet portion of the tubular section 24,25. In embodiments, see e.g. FIG. 4D, the elbow housing part 23 forms a curved section between the meat supply opening and the connection to the tubular section of the housing of the interface module.

The outlet portion of the tubular section 24, 25, as an example, includes an upper part 24 of truncated form extending from the first end 241 and a lower part 25 substantially of cylindrical form extending towards the second end 201 of the upper truncated part 24.

The upper part 24 of truncated form therefore has, here, a cross section varying along the upper part 24 by decreasing from the first end 241 towards the second end 201 of the tubular section 24, 25. In a variant of an embodiment, the upper 24 and lower 25 parts are identical and of cylindrical form with the same cross section.

The interface module 20, here the elbow housing part 23 of the housing, comprises a meat supply opening 21 to receive the supply of meat mass (flow E) from the meat supply pump.

The interface module 20 further comprises an additive supply opening 305 to receive a flow of additive that is pumped by the additive supply pump 302 from an additive storage 303, e.g. a tank or a hopper 303, via the additive supply channel 301.

The module 20 is provided with additive distribution means 304.

At the additive supply opening 305 the additive supply channel 301 is releasably connected to the additive distribution means 304 here illustratively depicted as tube 304 having one or more end points with an end point opening to release the additive into the meat mass at these one or more end points arranged around the drive shaft 30, 31, here within the elbow housing part 23.

The additive supply will be discussed in more detail in FIGS. 4A-F.

The outlet portion of the tubular section 24, 25 includes an inner wall 202. At the level of the first end 241, the outlet portion of the tubular section 24, 25 includes a first edge 242 extending, here, centripetally from the inner wall 202. The first edge 242 extends, in addition, over a circumference of a cross section of the inner wall 202 at the level of the first end 241. In a variant, the first edge 242 extends discontinuously and forms a series of discrete edge nozzles evenly distributed over said circumference. Similarly, at the level of the second end 201, the outlet portion 24, 25 of the tubular section includes a second edge 251 extending, here, centripetally from the inner wall 202. The second edge 251 extends, in addition, over a circumference of a cross section of the inner wall 202 at the level of the second end 201, continuously. In a variant, the second edge 251 extends discontinuously and forms a series of discrete edge nozzles substantially evenly distributed over said circumference.

The interface module 20 further, as an optional feature, includes a grinding plate 28 which is, in FIG. 2, positioned in the outlet portion of the tubular section 24, 25 perpendicularly to the axis of the tubular section 24, 25. The grinding plate 28 may be in proximity to the meat delivery opening or even form the meat delivery opening. In a manner known per se, the grinding plate 28 includes a series of orifices crossing a thickness distributed over the surface of the grinding plate 28. Once in position in the tubular section 24, 25, the series of through-bore orifices have their axis parallel to the axis of the tubular section 24, 25. On the other hand, the grinding plate 28 includes an edge 281 over a circumference of a side wall of the grinding plate 28. The edge 281 extends radially from this side wall.

In the depicted exemplary configuration of the system 10 for forming hamburger patties S according to the invention as illustrated in FIG. 2, the grinding plate 28 is in a position at the level of the second end 201 of the outlet portion of the tubular section 24, 25, the edge 281 of the grinding plate 28 thus being supported by the second edge 251 of the tubular section 24, 25. Maintaining this support is ensured by the forces exerted by a flow E of the mass of meat V passing through the grinding plate 28. A surface of the second edge 251 receiving in support the grinding plate 28 facing the flow E of the mass of meat V.

The interface module 20 here further includes a grinding blade 27 cooperating with the grinding plate 28. The grinding blade 27 is assembled on an end of a shaft extender 26 that extends the drive shaft 30, 31, such that the latter can drive the grinding blade 27 in a rotational movement. To facilitate assembly and disassembly, the grinding blade 27 is assembled so that it can be moved sliding over the end of the shaft extender 26. The shaft extender 26 is moreover assembled free to slide over the end 31 of the drive shaft 30, the latter driving the shaft extender 26 in a rotational movement. The grinding blade 27 is supported on the grinding plate 28, upstream of it in the direction of the flow E of the mass of meat V.

The mould 14 of the system for forming ground meat pieces 10 according to the invention, here is a drum-type mould. It includes a drum 14 rotated around an axis 141. Over an outer surface, the drum 14 includes a series of cavities 140. These cavities 140 are therefore mobile relative to the interface module(s) 20 and are used to form ground meat pieces in patty form from the mass of meat V exiting the interface module 20.

In this configuration of the system 10 for forming ground meat pieces S according to the invention, the grinding plate 28 is situated just at the inlet of the cavity 140. Thus, during an injection of a mass of meat V into the cavity 140, the meat fibres F are arranged randomly in the volume of the cavity 140. With the drum 14 rotating, the system for forming ground meat pieces S according to the invention includes means for controlling an injection of a mass of meat V into the cavity 140. These control means are arranged so as to carry out the injection during a very strong deceleration, possibly stopping, of the rotation of the drum 14, and therefore of the cavity 140, when the latter arrives at meat delivery opening of the module 20.

Figure 3:
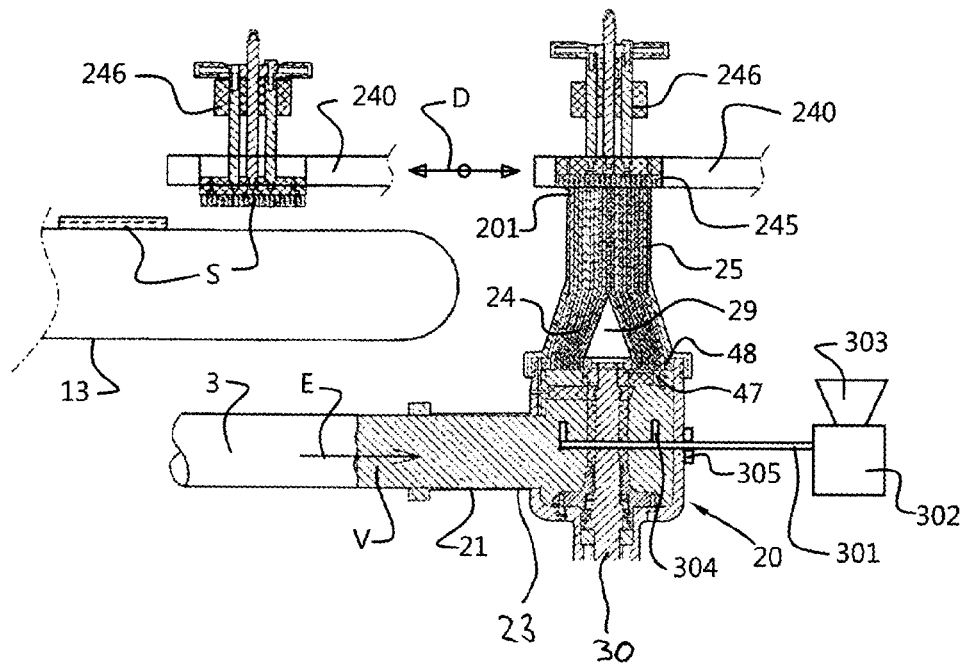
FIG. 3 is a partial cross-section and schematic view of a variant of an embodiment of the system for forming ground meat pieces according to the invention.

FIG. 3 is a partial cross-section and schematic view of a variant of an embodiment of the system for forming ground meat pieces according to the invention. This variant of an embodiment of the system for forming ground meat pieces 10 according to the invention is differentiated from the method defined above by the fact that the drum-type mould is replaced by a compartment mould 240, in itself known per se.

The moulding of the form of the hamburger S to be developed is produced in the cavities 245 which are filled, here, from the underside. A moulding system 246 then enables to mould and push off the hamburger S developed on the conveyor 13, following a movement D of the compartment 240 from the mould. The element for forming an interface 20 defined above is thus situated in the extension of the conveyor 13, as illustrated in FIG. 3. The interface module 20 as defined above of the system for forming ground meat pieces 10 according to the invention as described in this specification can be used in the same way with a compartment mould 240. In FIG. 3 the movement D is an intermittent translation from the fill position on the right-hand side of FIG. 3 to the ejection position on the left-hand side of this figure. In an alternative implementation (not shown) the movement D of the mould is a rotation of mould 240 such that a mould cavity rotates from its fill position to its ejection position, effectively resulting in a mould carrousel with a global configuration similar to the embodiment shown in FIG. 3.

FIG. 4A-F are partial cross-sections and schematic views of variants of embodiments of the interface module according to the invention.

Figures 4A, 4B, 4C:
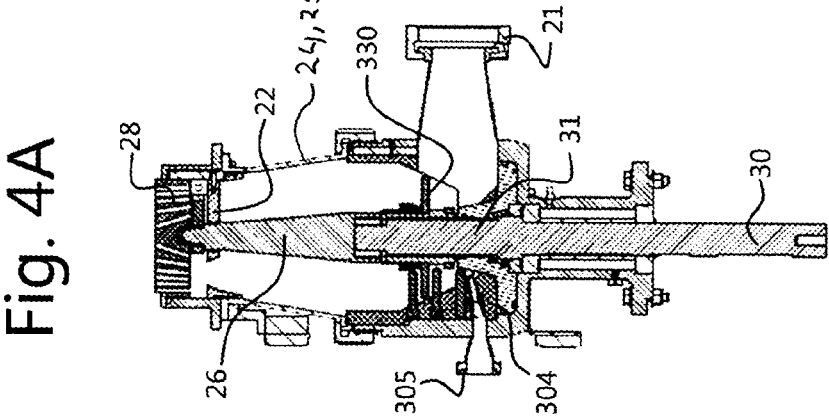

FIG. 4A shows an interface module 20 configured for forming a so-called butcher burger with marination. Grinder plate 28 comprises a multitude of holes through which the meat mass is pressed to form a specific consistency for the formed minced meats product, in casu, a butcher burger. Associated with the grinder plate 28 is a mobile grinder member, e.g. a stripper plate 22, which is mounted to the extension shaft 26 which is driven by drive shaft 30, 31. The meat mass is supplied to the interface module via meat supply opening 21 and urged through by the meat supply pump (not shown). On the opposite side of the meat supply opening 21, an additive supply opening 305 is provided to receive additive from the additive supply pump (not shown). In casu, the additive is a relatively fluid marinade containing an aqueous solution of salt, herbs and other flavorings. The marinade is urged through the additive distribution means 304 and is provided to the meat mass in the interface module 20.

On the drive shaft 31, a mixer 330, e.g. embodied as a mixing rod 330, is provided to mix the marination into the meat mass in order to render a substantially homogenous marinated meat mass which is subsequently pushed into the mould cavity at the meat delivery opening of the interface module, here located at grinding plate 28.

With reference to FIG. 4B a similar but slightly altered embodiment is depicted wherein the grinder plate 28 and stripper plate 22 are not located at the meat delivery opening of the interface module but are mounted inside the tubular section of the interface module 20. This configuration is in this case used to form a so-called "home style burger" with marination. At the second end of the drive shaft 31 not only the stripper plate is mounted to the shaft but also a mixing rod 330 is fixedly mounted to the drive shaft in order to homogenize the marinade with the meat mass.

FIG. 4C shows an interface module for an alternative type of minced meats product to be formed in the mould cavity above the meat delivery opening of the interface module to form a so-called "standard burger" with marination, but this configuration is also very useful for forming meat products formed by chopped pieces of meat that are not grinded or minced, such as e.g. pieces of approximately 10×10×30 mm, or chunks of 10×10×10 mm. In this alternative embodiment no grinding plate and/or stripper plate are present at the interface module. The meat mass entering the interface module is marinated by mixing rod 330 and provided to the mould in substantially the same consistency as it is provided at the meat supply opening 21.

In FIGS. 4A-4C the marination is mixed into the meat mass supplied from the meat mass hopper as shown in FIG. 1.

In the hopper a volume of chilled minced meat is provided, typically in the range of 75-500 kilograms, but depending on the application and production volumes, the hopper may also contain more than 500 kilograms. This meat may be minced or cut up whole muscle pieces and may by prepared with basic seasoning and other additives. As the volume of marinated meat is relatively small, in particular in comparison with the volume inside of the hopper, it is relatively easy to switch the type of marination to add to the meat mass in the hopper.

For example, if an amount of minced meat mass is seasoned before entering the hopper 11 with basic herbs and salt this volume of 250 kilograms can be processed into 150 kilograms of formed products with marination A. 75 kilograms with marination B, and 25 kilograms of marination C. This results in a very economical processing of the meat, enabling the production of three flavors of minced meats products with minimal change-over time and minimal losses of marinated meat that is present in the pipes between the hopper and the mould at the time of changing to another product flavor.

Figures 4D, 4E, 4F:
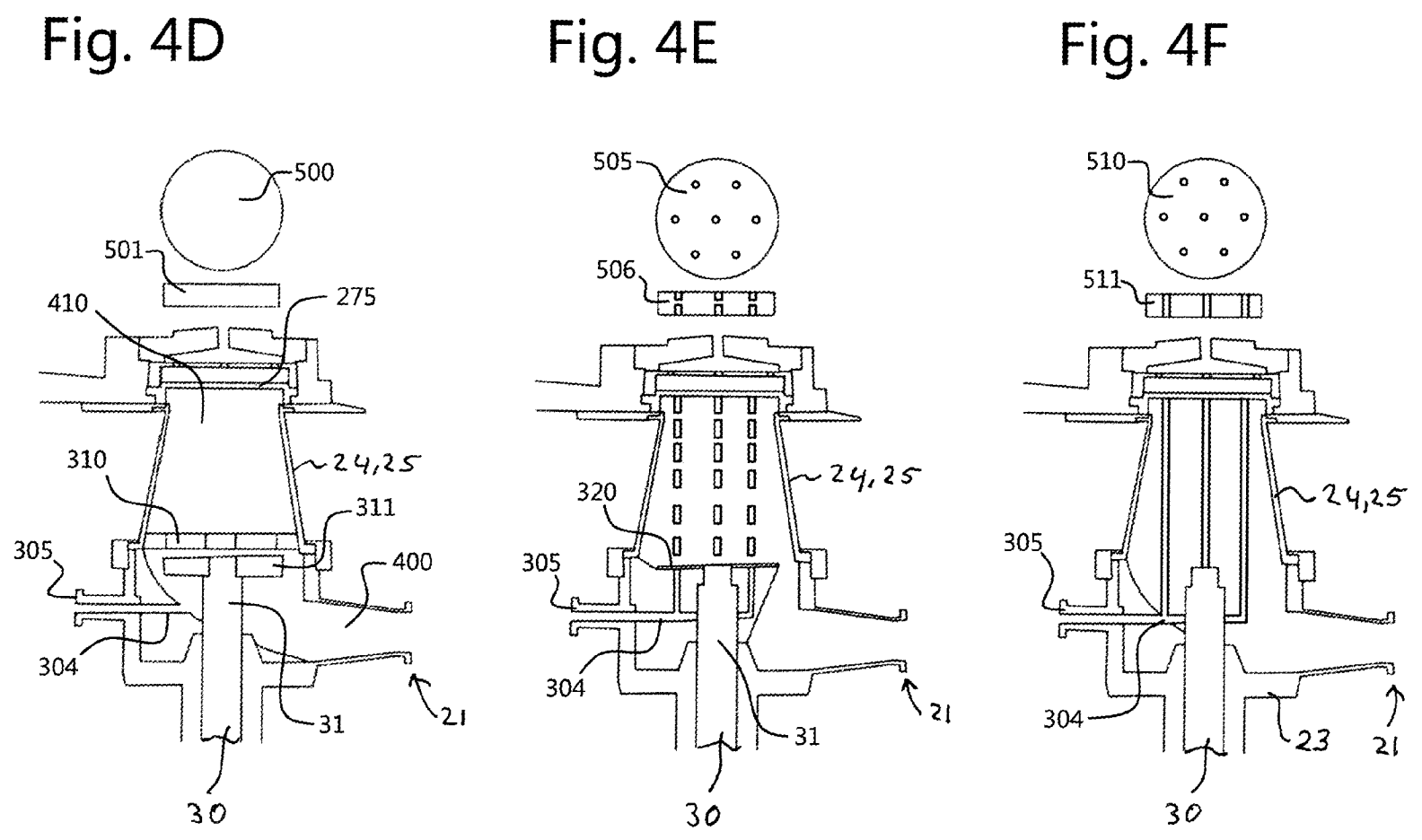

FIG. 4D depicts a similar configuration as described in FIGS. 4A-C, but in this case the additive supplied to additive supply opening 305 is fed through additive distribution means 304 and enters the tubular section of the interface module 20 in which distribution tool 311, in casu a mixing rod 311 is mounted on the drive shaft. Adjacent to the rotating distribution tool is a stator with relatively course holes intended for mixing the additive into the meat mass. The holes in this stator 310 are larger than e.g. in the grinding plates as described above, as this stator is not intended to modify the consistency of the meat per se, but to aid in mixing the additive to the meat mass. Such bigger holes in the stator also aid in case the additive is a viscous or solid inclusion as inclusions are intended to end up in the end product as individual portions of additive, and typically not grinded as a homogenous mass.

Whereas meat mass 400 may comprise only a basic seasoning as applied in the hopper 11, the meat mass in the upper end of the tubular section 410 may comprise one or more inclusions such as olives, tomatoes, union and other course herbs, vegetables and/or fruits. In casu the mix of coarsely chopped inclusions is mixed with a specific marinade comprising a more fluid solution of salt, aromas and flavors which is mixed into the meat mass by rotor 311. This results in a formed minced meats product comprising a substantially homogenized consistency of the basic meat mass 400, mixed with the coarsely chopped inclusions and a marinade. As an illustration a very schematic top view and cross-section is shown as elements 500 and 501 respectively.

FIG. 4E shows an alternative embodiment similar to the one shown in FIG. 4D, wherein a viscous paste is distributed in the meat mass. The additive distribution means 304 are shown illustratively as a pipe branching off into three end points in the meat mass. Right above these end points, a knife 320 is mounted fixedly to the rotating drive shaft 31. The knife rotates through the meat mass and the viscous paste released from the distribution means and cuts up the paste into discrete portions which as transported towards the mould. The viscous paste is in this case a red paste mimicking the taste and structure of paprika, but it will be appreciated that many viscous pastes will be suitable as an additive to the minced meats product to be formed. As an illustration a very schematic top view and cross-section is shown as elements 505 and 506 respectively.

FIG. 4F illustrates an alternative similar to previous embodiment, however in this embodiment the flow of viscous paste is not cut up when distributed into the meat mass. In casu, a viscous cheese paste is released into the meat mass. It will again be appreciated that many additives are suitable to be released into the meat mass depending on the product specification of the minced meats products to be formed. As an illustration a very schematic top view and cross-section is shown as elements 510 and 511 respectively.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. A plurality may also indicate a subset of two or more, out of a larger multitude of items. The term another, as used herein, is defined as at least a second or more. The terms including and/or having, as used herein, are defined as comprising (i.e., open language). The term coupled, as used herein, is defined as connected, although not necessarily directly.

Elements and aspects discussed for or in relation with a particular embodiment may be suitably combined with elements and aspects of other embodiments, unless explicitly stated otherwise. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A system for forming moulded meat products from a meat mass comprising:
   a mould comprising at least one mould cavity for forming a moulded meat product;
   a meat supply pump for controllably supplying the meat mass via a meat supply channel;
   an interface module for connecting the meat supply channel to the mould, wherein the interface module comprises:
   a tubular section;
   a meat supply opening configured to engage with the meat supply channel;
   a meat delivery opening configured to deliver the meat mass from the interface module into the at least one mould cavity;
   a rotatable drive shaft comprising a first end outside the tubular section, configured to engage with a drive means and a second end extending inside the tubular section;
   wherein the system further comprises an additive supply for controllably supplying an additive via an additive supply channel, and
   wherein the interface module further comprises an additive supply opening configured to engage with the additive supply channel, such that the additive supply channel is fluidly connectable to an additive distribution means for distributing the additive into the meat mass inside of the tubular section,
   wherein the additive distribution means comprise a tube extending from the additive supply opening and bifurcating into a plurality of end points,
   wherein the plurality of end points are distributed over the cross-section of the tubular section.

2. The system according to claim 1, wherein the drive shaft extends into the section of the interface module where the distribution means in operation distribute the additive into the meat mass.

3. The system according to claim 1, further comprising a grinding plate mounted to the interface module by holding means for holding the grinding plate in a cross section of the tubular section.

4. The system according to claim 1, wherein the mould comprises one of a rotatable drum, a rotatable plate and a reciprocal plate.

5. The system according to claim 1, further comprising a meat supply pump controller configured to, in operation, activate the meat supply pump to intermittently supply an amount of meat mass.

6. The system according to claim 5, wherein the meat supply pump controller is configured to activate the meat supply pump in response to detection of an available mould to be filled and
   wherein the amount of supplied meat mass is related to a volume of the mould to be filled.

7. The system according to claim 1, wherein an additive distribution tool is mounted to the second end of the rotatable drive shaft.

8. The system according to claim 7, wherein the additive distribution tool is configured to at least partially homogenize the additive with the meat mass.

9. The system according to claim 7, wherein the additive distribution tool is configured to cut a flow of additive from the additive distribution means into discrete portions of additive.

10. The system according to claim 1, wherein the additive is a marination fluid.

11. The system according to claim 1, wherein the additive is a solid or viscous inclusion.

12. The system according to claim 1, wherein the drive shaft is rotatable around an axis of rotation that is directed substantially perpendicular to a ground plane of the mould cavity,
   wherein a flow direction at the meat supply opening of the interface module is directed substantially perpendicular to the axis of rotation of the drive shaft.

13. The system according to claim 1,
   wherein the plurality of end points terminate substantially at the second end of the drive shaft as seen in flow direction of the meat mass.

14. The system according to claim 1, wherein the interface module further comprises a homogenizing means statically mounted in the tubular section of the interface module downstream the second end of the drive shaft as seen in flow direction of the meat mass.

15. The system according to claim 1, wherein the tubular section comprises an inlet portion that extends from the meat supply opening to an adjoining outlet portion of the tubular section,
   wherein the outlet portion of the tubular section extends to the meat delivery opening.

16. The system according to claim 15, wherein the inlet portion of the tubular section is delimited by an elbow housing part with the meat supply opening at one side thereof and with a connection to the outlet portion of the tubular section at another side thereof.

17. The system according to claim 16, wherein the additive distribution means are located in and/or integrated in the inlet portion of the tubular section in the elbow housing part.

18. The system according to claim 16, wherein the additive distribution means define one or more distribution points within the elbow housing part,
   wherein the additive is supplied to the meat mass within the elbow housing part, for example wherein the one or more distribution points are located at a distance upstream of a join between the elbow housing part and the outlet portion of the tubular section, for example wherein a grinder and/or mixer is located in proximity of the join between the elbow housing part and the outlet portion of the tubular section.

19. The system according to claim 16, wherein the one or more distribution points are located in proximity of the join between the elbow housing part and the outlet portion of the tubular section.

20. The system according to claim 16, wherein the one or more distribution points are located in the outlet portion of the tubular section, in proximity of the meat delivery opening.

21. A method for forming moulded meat products from a meat mass, wherein use is made of a system according to claim 1.

22. The method according to claim 21, wherein consecutively batches of a first variant of the meat products and of a second variant of the meat products are formed from a basic meat mass that is stored in a storage of the system, the variants differing in terms of one or more additives that are added to the basic meat mass via the additive distribution means, wherein the method comprises a changeover from the forming of the first variant to the forming of the second variant, wherein the changeover involves keeping the basic meat mass in the storage, meat supply pump, and meat supply channel, whilst cleaning the one or more interface modules of the system.

23. The method according to claim 22, wherein cleaning of the the interface module during the changeover comprises disconnecting the the interface module, cleaning the disconnected interface modules, and reconnecting the cleaned interface modules, or wherein the cleaning comprises disconnecting the one or more interface modules and exchanging the one or more disconnected interface modules for one or more other interface modules that are clean.

24. The method according to claim 21, wherein the additive supplied via the additive distribution means comprises a marination fluid and/or one or more inclusions, wherein said one or more inclusions comprise or consist of chopped vegetables or chopped fruit including onions, tomatoes, olives, and/or paprika.

* * * * *